(12) United States Patent
Saori

(10) Patent No.: US 7,289,274 B1
(45) Date of Patent: Oct. 30, 2007

(54) TELESCOPIC ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/672,224

(22) Filed: Feb. 7, 2007

(30) Foreign Application Priority Data

Feb. 10, 2006 (JP) .............................. 2006-033506

(51) Int. Cl.
*G02B 15/14* (2006.01)

(52) U.S. Cl. .................. 359/687; 359/684; 359/685; 359/715; 359/740; 359/774

(58) Field of Classification Search ............... 359/687, 359/686, 715, 740, 774, 683–685
See application file for complete search history.

(56) References Cited

U.S. PATENT DOCUMENTS

| | | | | |
|---|---|---|---|---|
| 5,059,007 | A | * | 10/1991 | Tanaka ........................ 359/676 |
| 5,309,284 | A | * | 5/1994 | Nakatsuji ..................... 359/687 |
| 5,572,276 | A | * | 11/1996 | Hirakawa .................... 359/684 |
| 5,745,300 | A | * | 4/1998 | Usui et al. ................... 359/684 |
| 6,693,750 | B2 | * | 2/2004 | Sato ............................ 359/687 |
| 6,891,680 | B2 | * | 5/2005 | Sato ............................ 359/687 |
| 6,940,656 | B2 | * | 9/2005 | Oomura et al. ............. 359/687 |
| 7,085,069 | B2 | * | 8/2006 | Toyama ....................... 359/684 |
| 7,145,735 | B2 | * | 12/2006 | Harada ........................ 359/745 |
| 7,158,315 | B2 | * | 1/2007 | Shibayama .................. 259/690 |
| 2005/0157403 | A1 | * | 7/2005 | Sato ............................ 259/687 |
| 2006/0061873 | A1 | | 3/2006 | Saori |
| 2006/0139768 | A1 | | 6/2006 | Saori |
| 2007/0002459 | A1 | | 1/2007 | Saori |
| 2007/0103795 | A1 | | 5/2007 | Saori |

FOREIGN PATENT DOCUMENTS

| | | |
|---|---|---|
| JP | 6-051202 | 2/1994 |
| JP | 09-243391 | * 9/1997 |
| JP | 2000-019398 | 1/2000 |
| JP | 2001-356381 | 12/2001 |
| JP | 2002-006215 | 1/2002 |
| JP | 2003-090958 | 3/2003 |

(Continued)

OTHER PUBLICATIONS

English Language Abstract of JP 2000-019398.

(Continued)

*Primary Examiner*—Evelyn A. Lester
(74) *Attorney, Agent, or Firm*—Greenblum & Bernstein, P.L.C.

(57) ABSTRACT

A telescopic zoom lens system includes first through fourth lens groups, wherein upon zooming from the short to long focal length extremities, the first and fourth lens groups remain stationary, the second lens group moves toward the image side, and the third lens group moves toward the image side and thereafter moves toward the object side. The first lens group includes positive first and second sub-lens groups, the second sub-lens group being a focusing lens group and including a negative meniscus lens element having a convex surface on the object side and a positive lens element having a convex surface on the object side. The following condition (1) is satisfied:

$$2.7 < fIR/ft < 3.5; \quad (1)$$

wherein fIR and ft designate the focal lengths of the second sub-lens group and the entire zoom lens system at the long focal length extremity, respectively.

9 Claims, 11 Drawing Sheets

FOREIGN PATENT DOCUMENTS

| | | |
|---|---|---|
| JP | 2003-202497 | 7/2003 |
| JP | 2003-344766 | 12/2003 |
| JP | 2004-109559 | 4/2004 |

OTHER PUBLICATIONS

English Language Abstract of JP 2002-006215.
English Language Abstract of JP 2003-202497.
English Language Abstract of JP 2004-109559.
English Language Abstract of JP 6-051202.
English Language Abstract of JP 2001-356381.
U.S. Appl. No. 11/565,735 to Saori, filed Dec. 1, 2006. (still pending).
U.S. Appl. No. 11/690,275 to Saori, filed Mar. 23, 2007. (still pending).

* cited by examiner

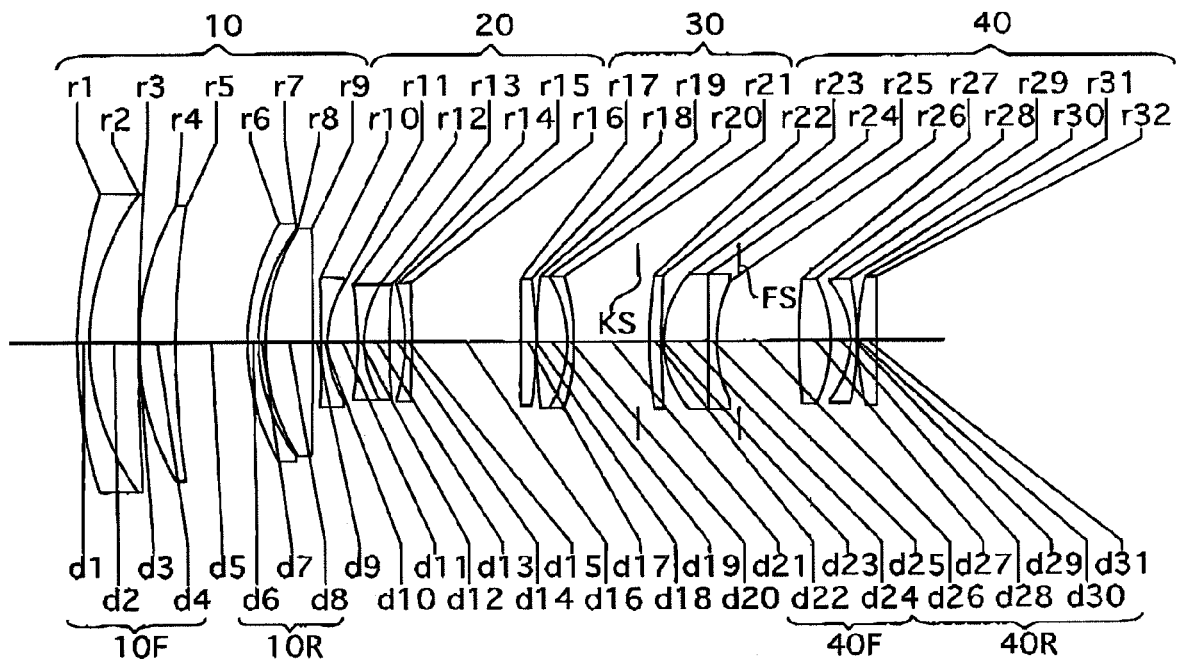
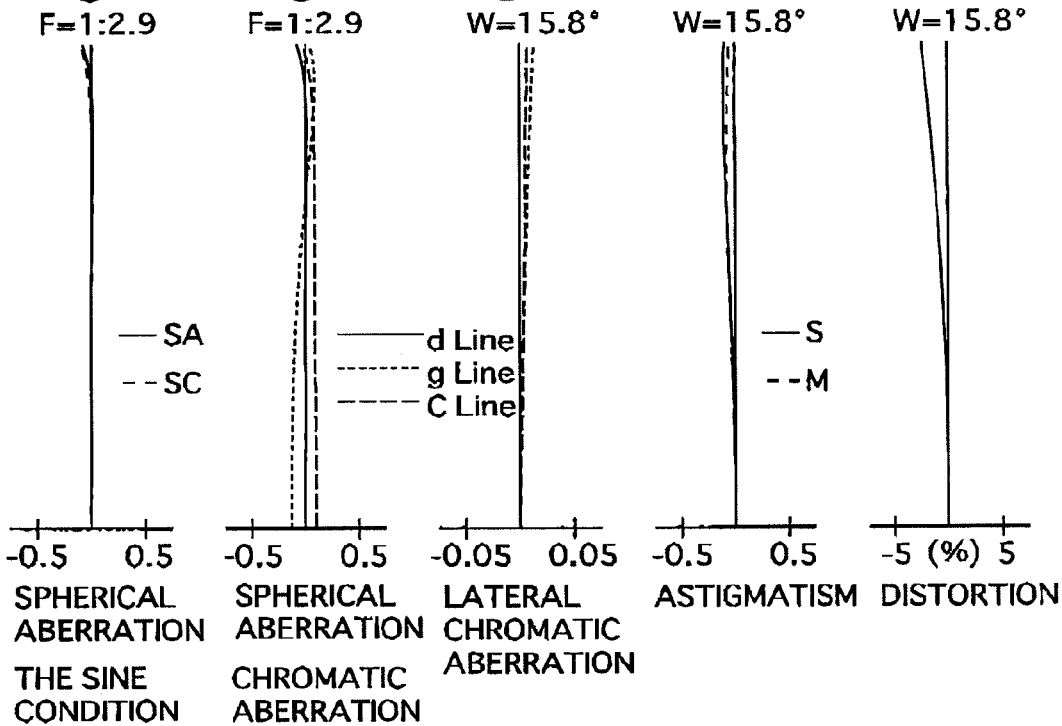

Fig. 3
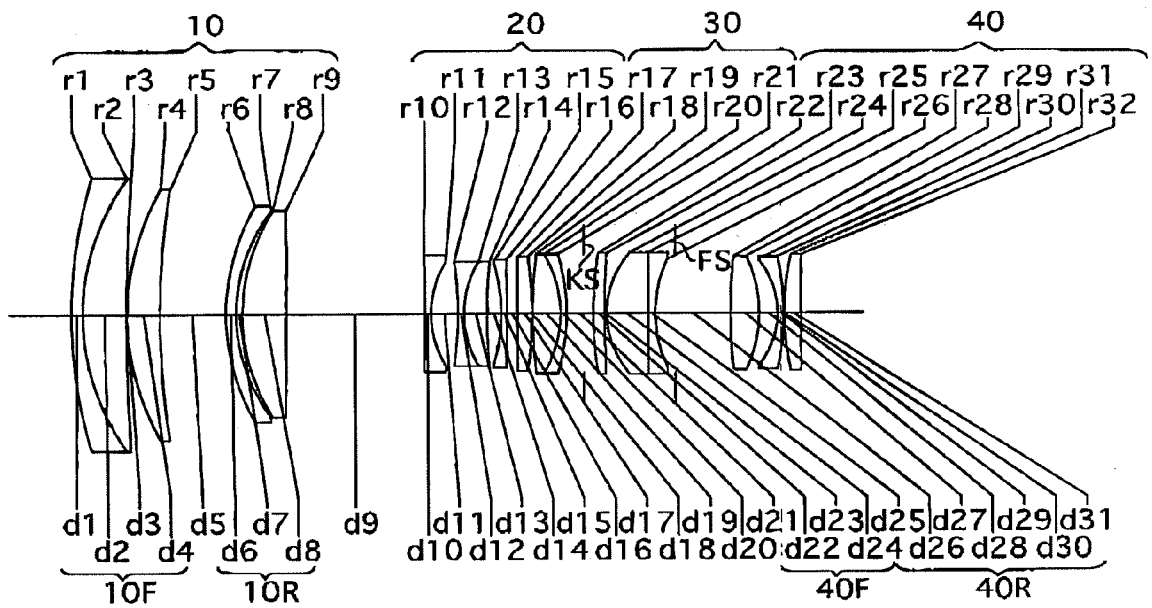
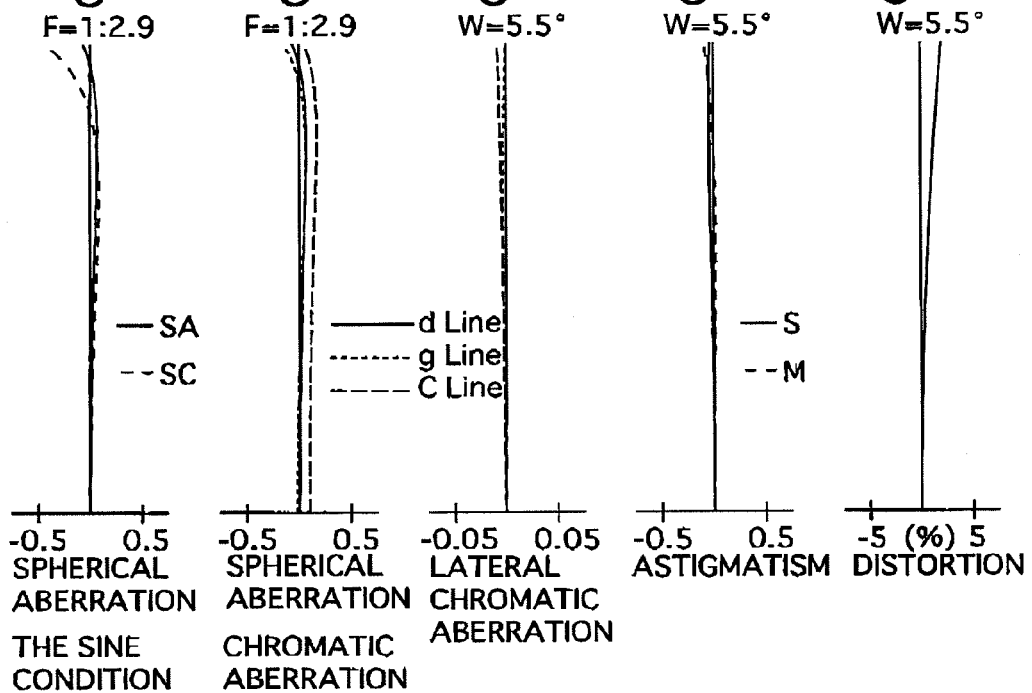

Fig. 5
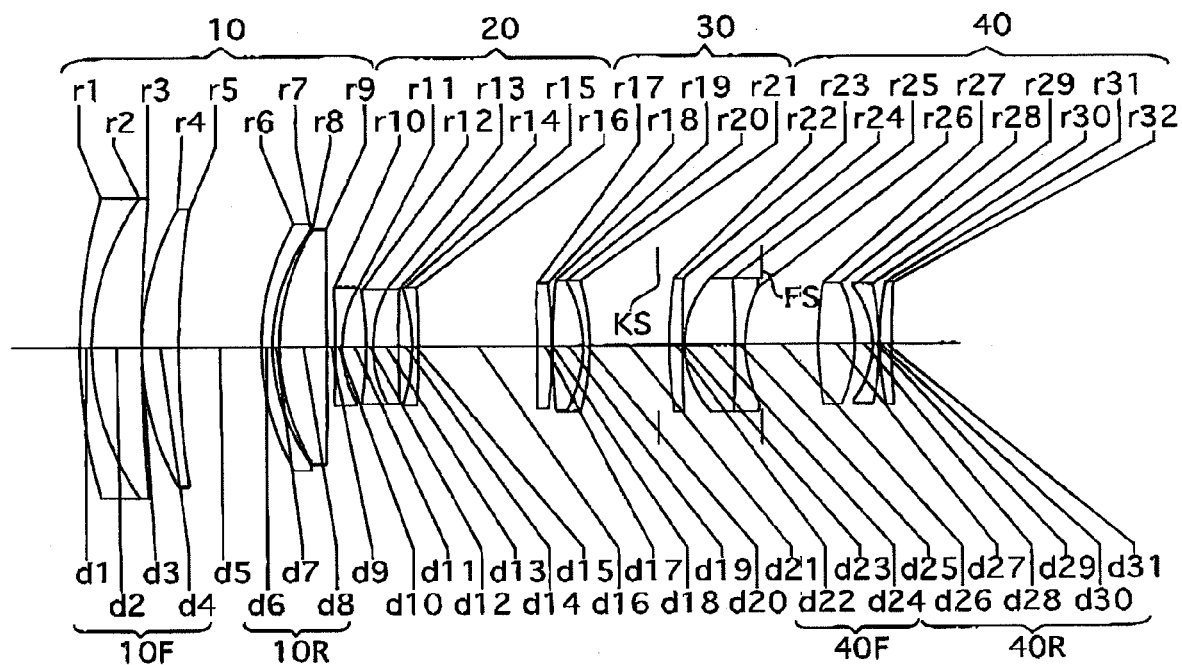
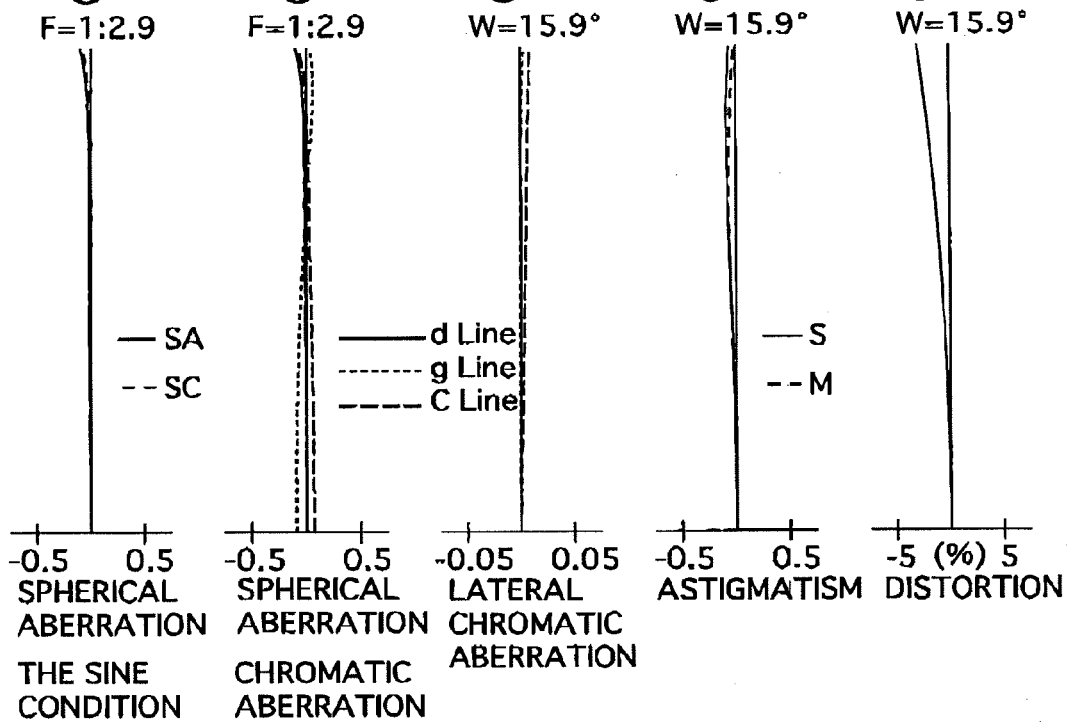
Fig.6A  Fig.6B  Fig.6C  Fig.6D  Fig.6E

Fig. 7
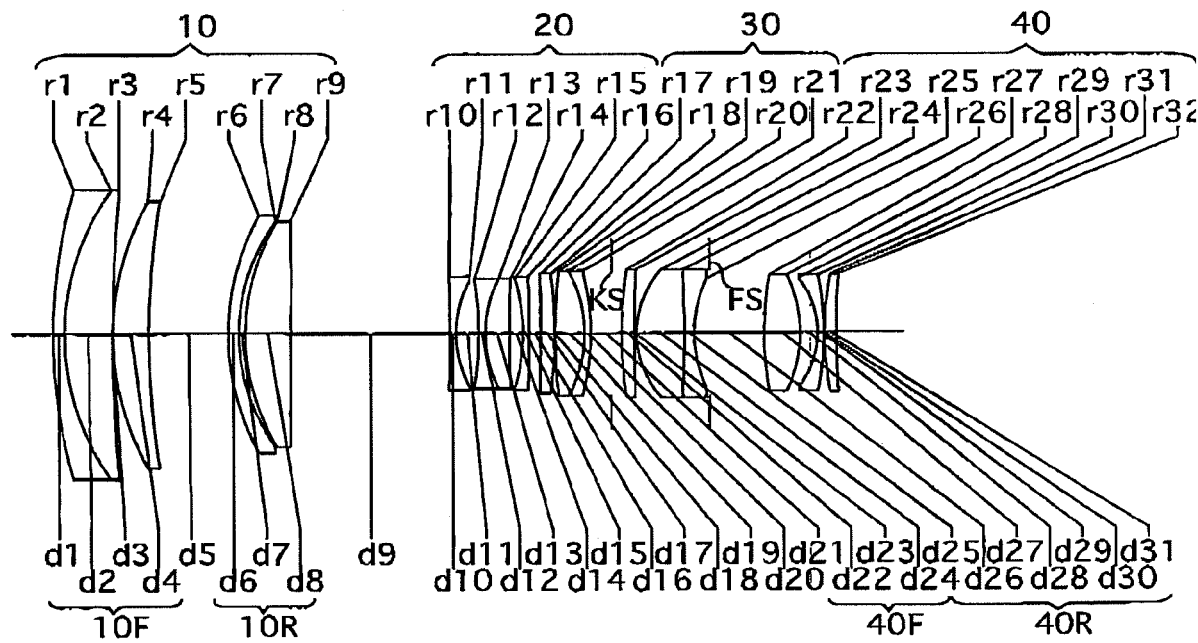
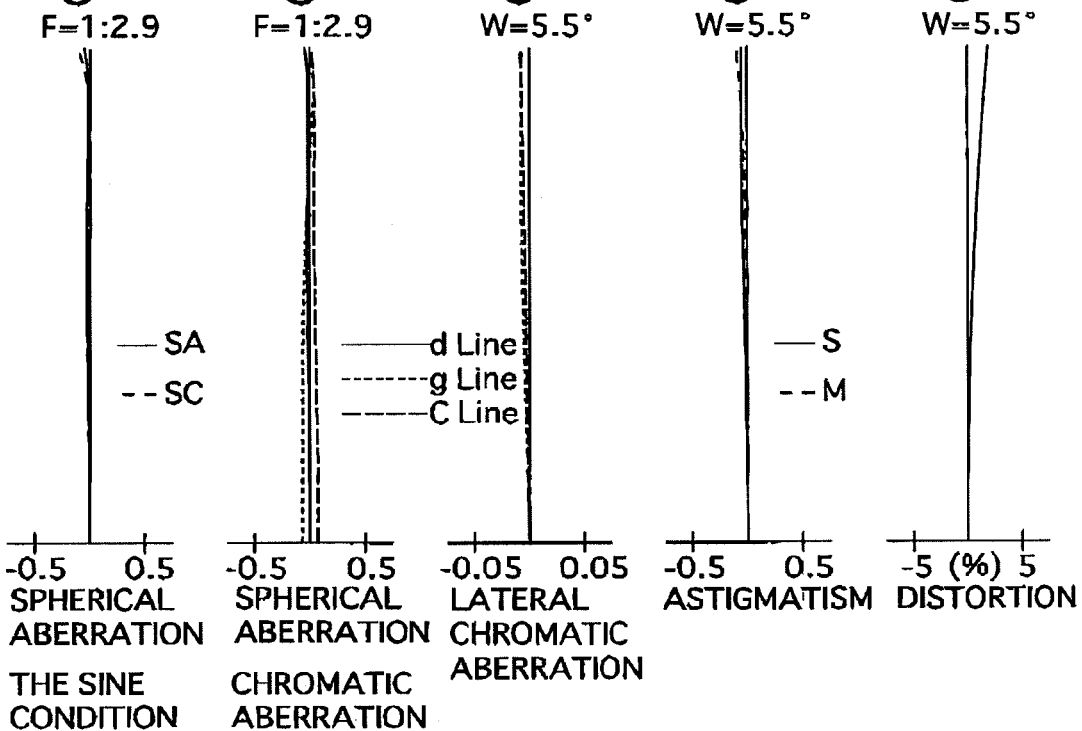

Fig. 13
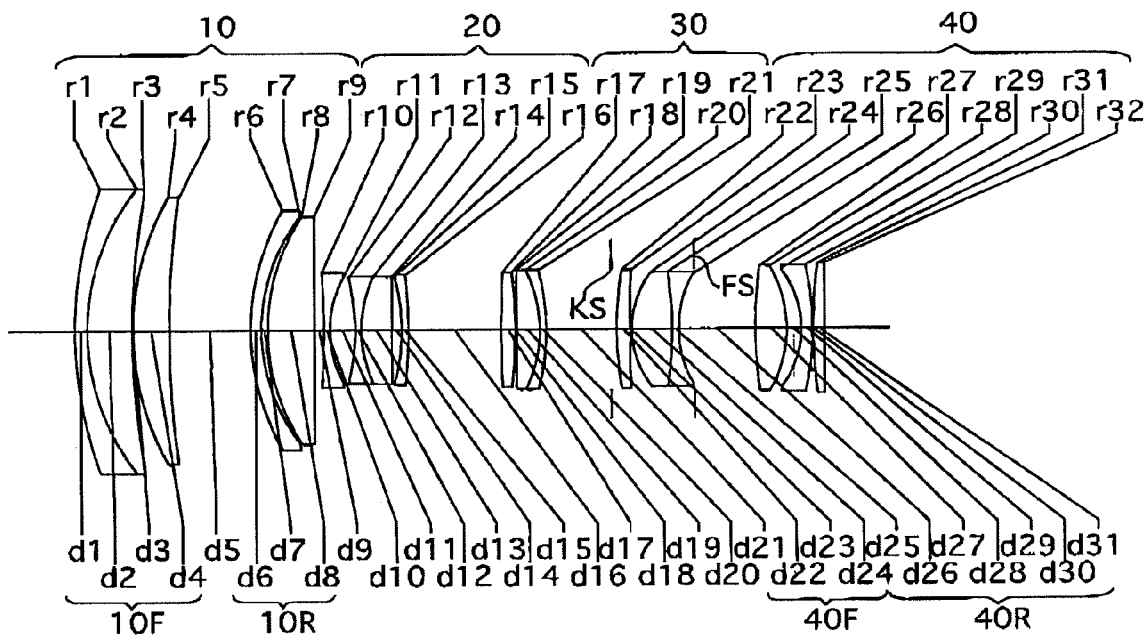
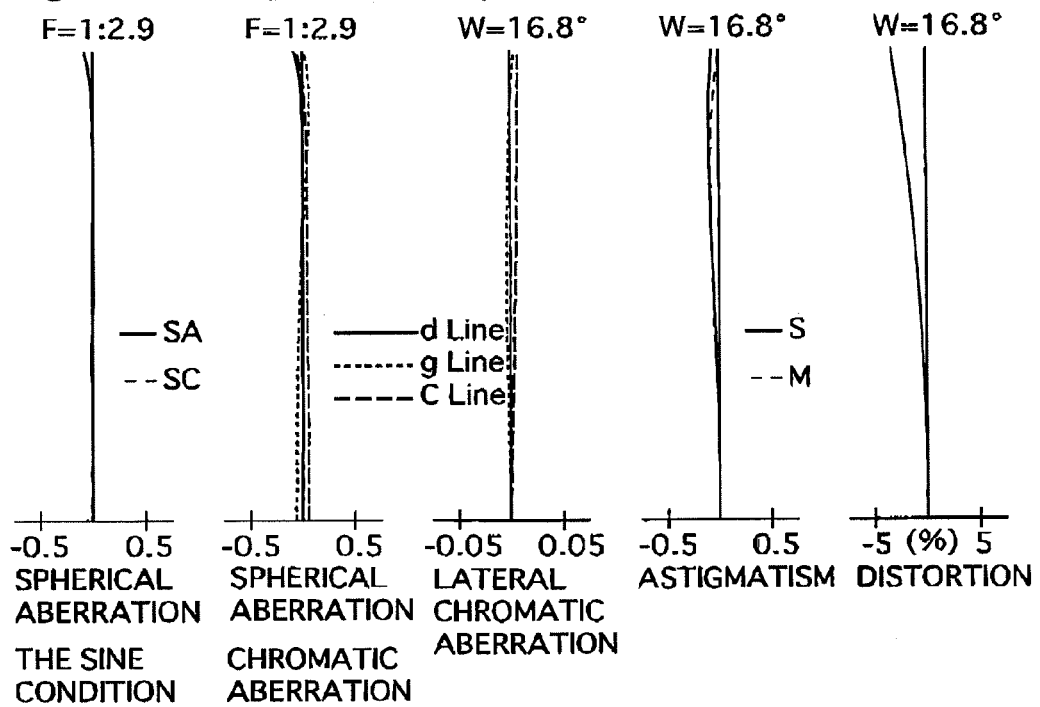
Fig. 14A  Fig. 14B  Fig. 14C  Fig. 14D  Fig. 14E

Fig. 17
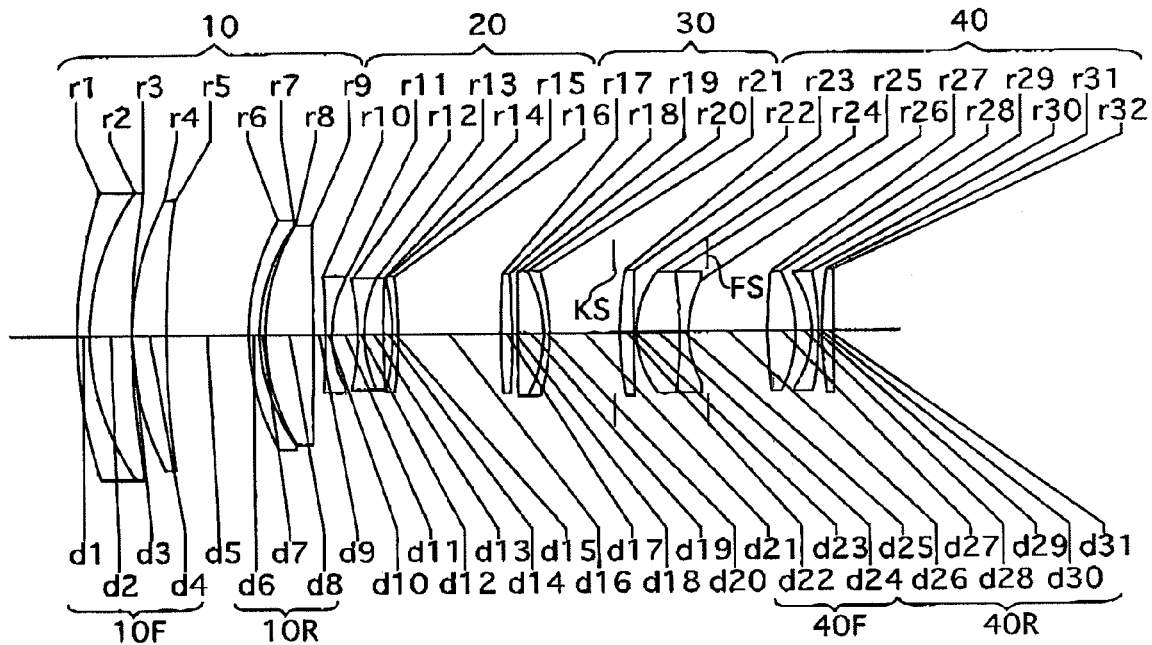
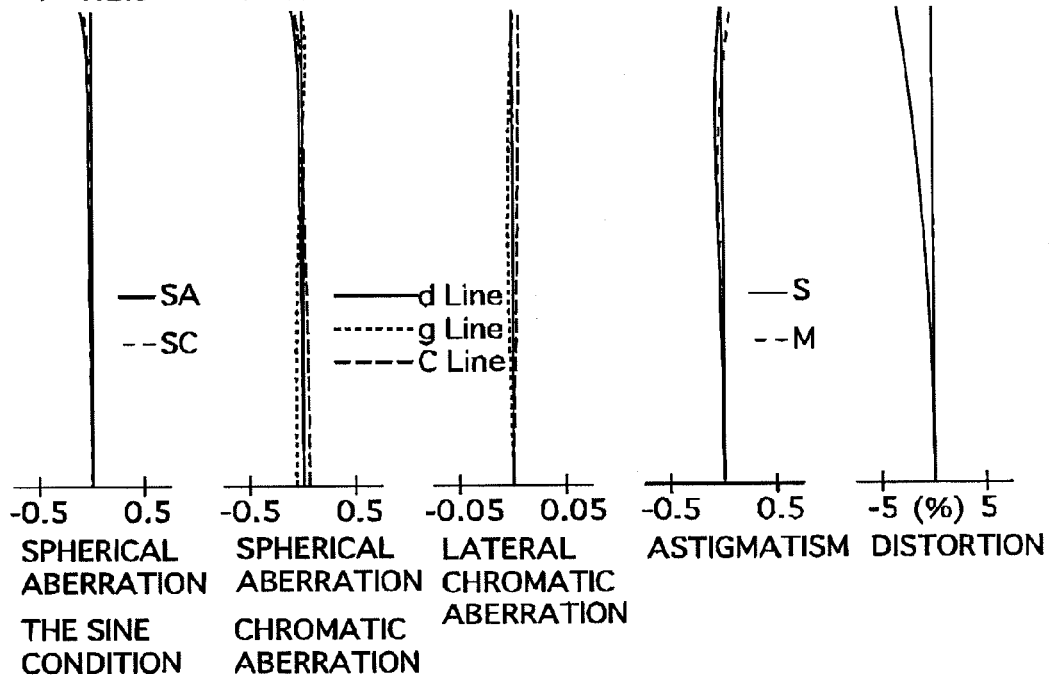
Fig.18A   Fig.18B   Fig.18C   Fig.18D   Fig.18E
F=1:2.9   F=1:2.9   W=16.8°   W=16.8°   W=16.8°
—SA        —d Line         —S
--SC       ------ g Line    --M
           ----- C Line
-0.5  0.5   -0.5  0.5   -0.05  0.05   -0.5  0.5   -5 (%) 5
SPHERICAL   SPHERICAL   LATERAL       ASTIGMATISM  DISTORTION
ABERRATION  ABERRATION  CHROMATIC
THE SINE    CHROMATIC   ABERRATION
CONDITION   ABERRATION Fig. 19
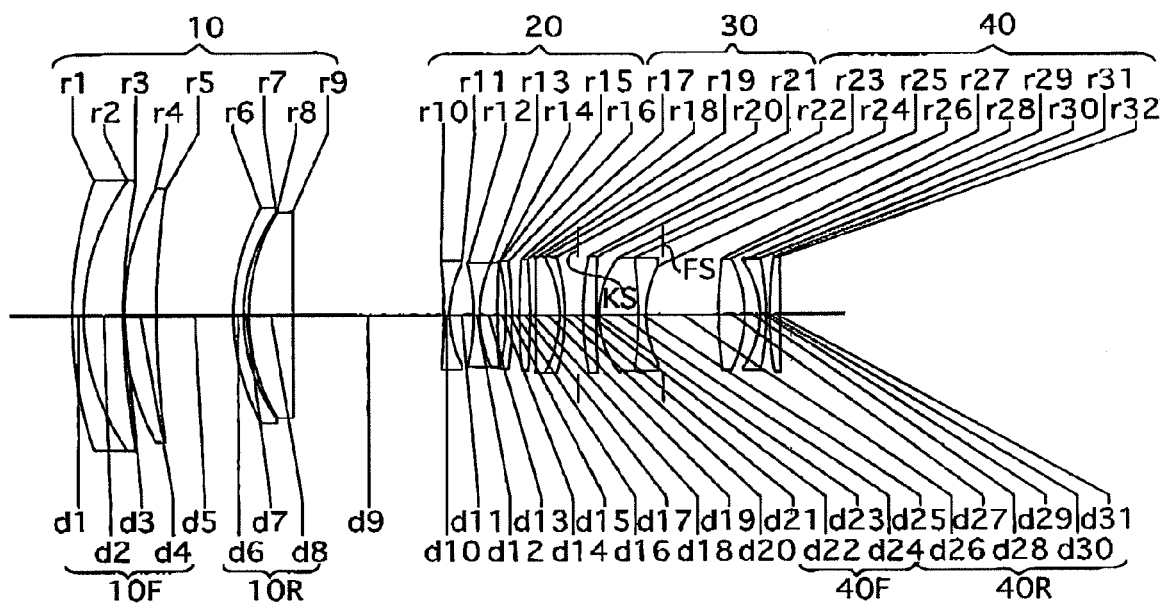
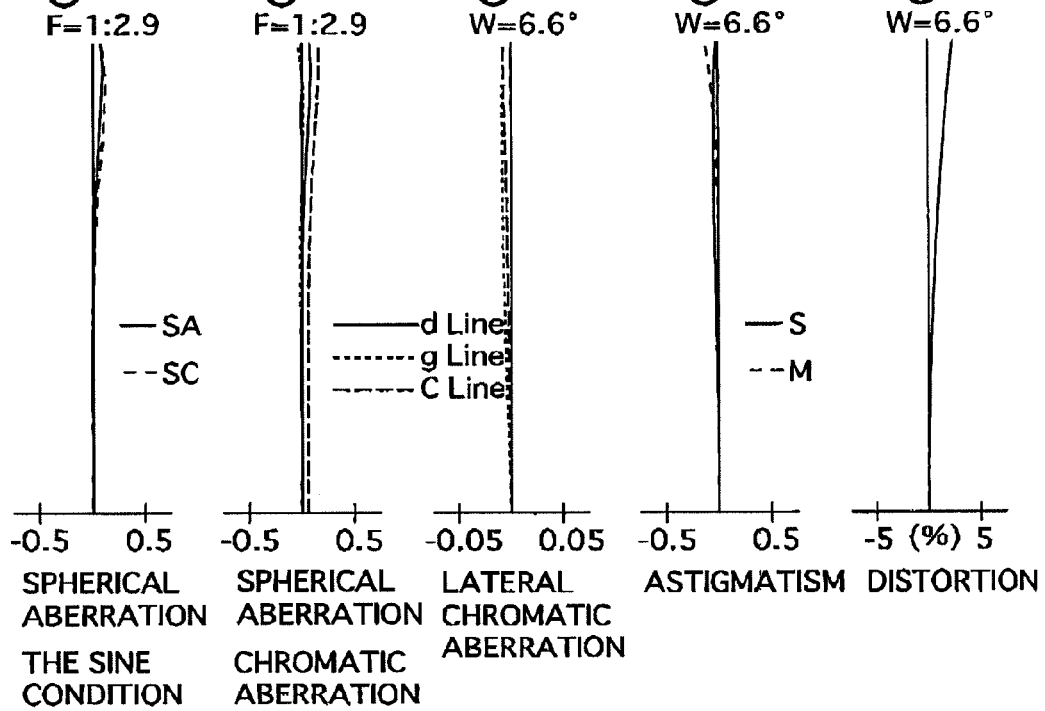
Fig.20A  Fig.20B  Fig.20C  Fig.20D  Fig.20E
F=1:2.9   F=1:2.9   W=6.6°   W=6.6°   W=6.6°
—SA      —d Line   —S
--SC     ······g Line   --M
         ---C Line
-0.5  0.5  -0.5  0.5  -0.05  0.05  -0.5  0.5  -5 (%) 5
SPHERICAL    SPHERICAL    LATERAL         ASTIGMATISM  DISTORTION
ABERRATION   ABERRATION   CHROMATIC
THE SINE     CHROMATIC    ABERRATION
CONDITION    ABERRATION

TELESCOPIC ZOOM LENS SYSTEM

BACKGROUND OF THE INVENTION

1. Field of the Invention

The present invention relates to a telescopic zoom lens system suitable for a single-lens reflex (SLR) camera.

2. Description of the Prior Art

In conventional telescopic zoom lens systems, a four-lens-group zoom lens system including a lens group having a positive refractive power (hereinafter, a positive lens group), a lens group having a negative refractive power (hereinafter, a negative lens group), a positive lens group and a positive lens group, in this order from the object, has been widely used, as disclosed in, e.g., Japanese Unexamined Patent Publication (JUPP) No. 2000-019398, JUPP No. 2002-006215, JUPP No. 2003-090958, JUPP No. 2003-202497, JUPP No. 2003-344766 and JUPP No. 2004-109559.

The above-discussed conventional telescopic zoom lens systems have been designed for a SLR camera with the 135 (35 mm) film format. Users already owning a lot of exchangeable photographing lenses for the 135 (35 mm) film format strongly wish to use a conventional exchangeable photographing lens with a recent digital SLR camera. Here, it should be understood that such a compatibility can be attained only when a digital SLR camera is provided with the same flange back length as that of a conventional SLR camera.

However, the size of an imaging device (CCD) of a digital SLR camera is considerably smaller than the frame size of the 135 (35 mm) film format. If an exchangeable photographing lens for the 135 (35 mm) film format is simply mounted on a digital SLR camera, the angle-of-view for photographing becomes smaller.

If an attempt is made, in a digital SLR camera, to maintain the same angle-of-view that can be attained in a conventional SLR camera, there is a need to shorten the focal length of an exchangeable photographing lens by the dimensional-ratio of frame size of the 135 (35 mm) film format to the size of an imaging device (CCD).

On the other hand, as discussed above, for the purpose of attaining the compatibility in which a conventional exchangeable photographing lens can be used with a digital SLR camera, the flange back length of a digital SLR camera has to be made the same as that of a conventional SLR camera. Accordingly, in the case when an exchangeable photographing lens for a digital SLR camera is newly designed, there exists a problem to be solved, i.e., both a shorter focal length and a longer back focal distance have to be attained at the same time. Here, note that just redesigning conventional photographing lenses for adjusting the same with the size of an imaging device (CCD) cannot solve the above problem, because according to such a simple re-scaling, when the focal length becomes shorter, the back focal distance also becomes shorter.

The present invention is to provide a miniaturized telescopic zoom lens system having the following features:

(i) an angle-of-view of approximately 10° to 30° (the zoom ratio: a little less than 3);

(ii) a long back focal distance;

(iii) a short focal length;

(iv) high optical quality; and (v) high operability.

SUMMARY OF THE INVENTION

According to an aspect of the present invention, there is provided a telescopic zoom lens system including a positive first lens group, a negative second lens group, a positive third lens group and a positive fourth lens group, in this order from the object.

Upon zooming from the short focal length extremity to the long focal length extremity, the positive first and the positive fourth lens group remain stationary, the negative second lens group moves toward the image, and the positive third lens group first moves toward the image and thereafter moves toward the object.

The positive first lens group is constituted by a positive front sub-lens group and a positive rear sub-lens group which are separated at a maximum air-distance therebetween.

The positive rear sub-lens group functions as a focusing lens group, and is constituted by a negative meniscus lens element having the convex surface facing toward the object, and a positive lens element having a convex surface facing toward the object, in this order from the object.

The positive rear sub-lens group satisfies the following condition:

$$2.7 < f1R/ft < 3.5 \tag{1}$$

wherein f1R designates the focal length of the positive rear sub-lens group; and ft designates the focal length of the entire telescopic zoom lens system at the long focal length extremity.

It is preferable that the positive fourth lens group include a front sub-lens group and a rear sub-lens group separated at a maximum air-distance therebetween, and that the rear sub-lens group satisfy the following condition:

$$1.8 < f4R/fw < 3.6 \tag{2}$$

wherein f4R designates the focal length of the rear sub-lens group of the positive fourth lens group; and fw designates the focal length of the entire telescopic zoom lens system at the short focal length extremity.

A fixed-aperture diaphragm FS is preferably provided between the front sub-lens group and the rear sub-lens group of the positive fourth lens group.

According to another aspect of the present invention, there is provided a telescopic zoom lens system including a positive first lens group, a negative second lens group, a positive third lens group and a positive fourth lens group, in this order from the object.

Upon zooming from the short focal length extremity to the long focal length extremity, the positive first and the positive fourth lens group remain stationary, the negative second lens group moves toward the image, and the positive third lens group first moves toward the image and thereafter moves toward the object.

The positive first lens group is constituted by a positive front sub-lens group and a positive rear sub-lens group which are separated at a maximum air-distance therebetween. The positive rear sub-lens group of the positive first lens group functions as a focusing lens group.

The positive fourth lens group includes a front sub-lens group and a rear sub-lens group separated at a maximum air-distance therebetween.

The telescopic zoom lens system satisfies the following conditions:

$$2.7 < f1R/ft < 3.5 \quad (1)$$

$$1.8 < f4R/fw < 3.6 \quad (2)$$

wherein f1R designates the focal length of the positive rear sub-lens group;

f4R designates the focal length of the rear sub-lens group of the positive fourth lens group;

ft designates the focal length of the entire telescopic zoom lens system at the long focal length extremity; and fw designates the focal length of the entire telescopic zoom lens system at the short focal length extremity.

In the above telescopic zoom lens system of another aspect of the present invention, a fixed-aperture diaphragm FS is preferably provided between the front sub-lens group and the rear sub-lens group of the positive fourth lens group.

In each aspect of the present invention, one positive lens element of the positive first lens group is preferably made of a glass material having an Abbe number of 80 or more.

In each aspect of the present invention, the telescopic zoom lens system preferably satisfies the following condition:

$$1.6 < f1/fw < 2.5 \quad (3)$$

wherein f1 designates the focal length of the positive first lens group; and fw designates the focal length of the entire telescopic zoom lens system at the short focal length extremity.

The present disclosure relates to subject matter contained in Japanese Patent Application No. 2006-033506 (filed on Feb. 10, 2006) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the telescopic zoom lens system, at the short focal length extremity, according to a first embodiment of the present invention;

FIGS. 2A, 2B, 2C, 2D and 2E show aberrations occurred, at the short focal length extremity, in the lens arrangement shown in FIG. 1;

FIG. 3 is a lens arrangement of the telescopic zoom lens system, at the long focal length extremity, according to the first embodiment of the present invention;

FIGS. 4A, 4B, 4C, 4D and 4E show aberrations occurred, at the long focal length extremity, in the lens arrangement shown in FIG. 3;

FIG. 5 is a lens arrangement of the telescopic zoom lens system, at the short focal length extremity, according to a second embodiment of the present invention;

FIGS. 6A, 6B, 6C, 6D and 6E show aberrations occurred, at the short focal length extremity, in the lens arrangement shown in FIG. 5;

FIG. 7 is a lens arrangement of the telescopic zoom lens system, at the long focal length extremity, according to the second embodiment of the present invention;

FIGS. 8A, 8B, 8C, 8D and 8E show aberrations occurred, at the long focal length extremity, in the lens arrangement shown in FIG. 7;

FIG. 13 is a lens arrangement of the telescopic zoom lens system, at the short focal length extremity, according to a fourth embodiment of the present invention;

FIGS. 14A, 14B, 14C, 14D and 14E show aberrations occurred, at the short focal length extremity, in the lens arrangement shown in FIG. 13;

FIG. 17 is a lens arrangement of the telescopic zoom lens system, at the short focal length extremity, according to a fifth embodiment of the present invention;

FIGS. 18A, 18e, 18C, 18D and 18E show aberrations occurred, at the short focal length extremity, in the lens arrangement shown in FIG. 17;

FIG. 19 is a lens arrangement of the telescopic zoom lens system, at the long focal length extremity, according to the fifth embodiment of the present invention;

FIGS. 20A, 20B, 20C, 20D and 20E show aberrations occurred, at the long focal length extremity, in the lens arrangement shown in FIG. 19.

DESCRIPTION OF THE PREFERRED EMBODIMENTS

Figure 21:
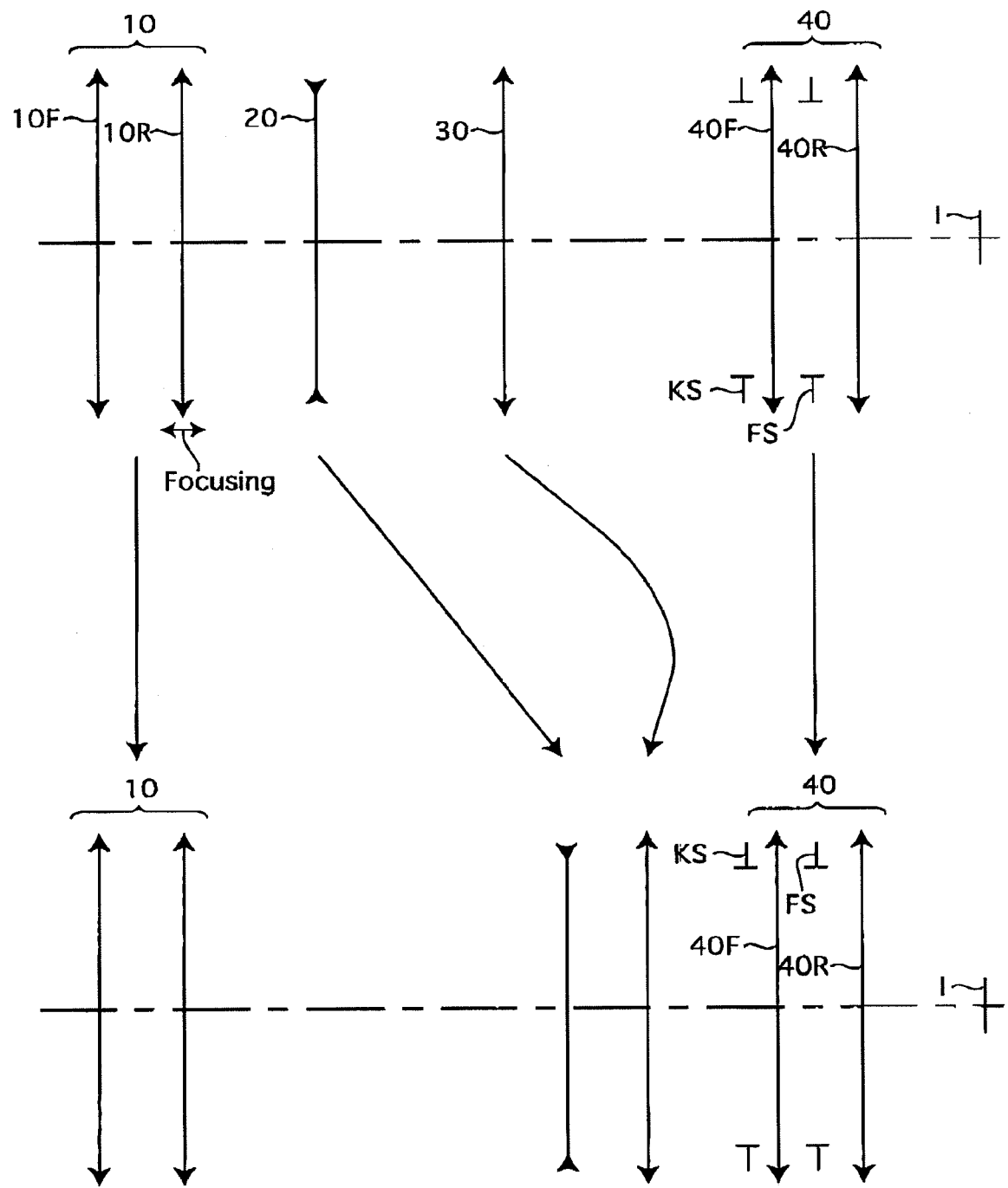
FIG. 21 is the schematic view of the lens-group moving paths for the telescopic zoom lens system according to the present invention.

The telescopic zoom lens system of the present invention, as shown in the lens-group moving paths of FIG. 21, includes a positive first lens group 10, a negative second lens group 20, a positive third lens group 30, and a positive fourth lens group 40, in this order from the object.

Upon zooming from the short focal length extremity to the long focal length extremity, the positive first lens group 10 and the positive fourth lens group 40 remain stationary (i.e., the distance therefrom to the image plane I does not vary), the negative second lens group 20 moves toward to the image, and the positive third lens group 30 first moves toward the image, and thereafter moves toward the object.

A variable-aperture diaphragm KS is provided between the positive third lens group 30 and the positive fourth lens group 40.

The positive first lens group 10 includes a front sub-lens group 10F and a rear sub-lens group 10R which are separated at a maximum air-distance therebetween. The front sub-lens group 10F and the rear sub-lens group 10R have a positive refractive power; and the rear sub-lens group 10R functions as a focusing lens group.

Furthermore, the positive fourth lens group 40 includes a front sub-lens group 40F and a rear sub-lens group 40R which are separated at a maximum air-distance therebetween. The front sub-lens group 40F and the rear sub-lens group 40R have a positive refractive power; and a fixed-aperture diaphragm FS is provided therebetween.

In a telescopic zoom lens system having a large f-number, the diameter of the first lens group is relatively small, so that an optical system in which the first lens group is movable upon zooming is generally employed. This is because the overall length of such a telescopic zoom lens system at the short focal length extremity becomes shorter, which is advantageous for miniaturization.

On the other hand, in a fast telescopic zoom lens system having a smaller f-number, it is preferable not to move the first lens group upon zooming since the first lens group has a large diameter and is relatively heavy.

In the telescopic zoom lens system of the present invention, for attaining a faster telescopic zoom lens system, the positive first lens group 10 and the positive fourth lens group 40 are arranged not to move upon zooming; and the negative second lens group 20 and the positive third lens group 30 which have smaller diameters and smaller number of lens elements are arranged to move upon zooming.

In the above arrangement (zoom mechanism) of the telescopic zoom lens system of the present invention, the front sub-lens group 10F and the rear sub-lens group 10R of the positive first lens group 10 are separated at a maximum air-distance therebetween, and focusing is carried out by the rear sub-lens group 10R.

More Specifically, upon focusing from an infinite object to a close-up object, the rear sub-lens group 10R moves from the image side toward the object side.

In a zoom lens system having a positive first lens group, a negative second lens group, a positive third lens group and positive fourth lens group, in this order from the object, there are such zoom lens systems in which focusing is carried out by the positive second lens group thereof which functions as a variator lens group. However, control of such a variator lens group is complicated, unlike a vari-focal lens system in which a traveling distance of the focusing lens group varies according to the focal length.

If an attempt is made to carry out focusing by the positive first lens group which remains stationary upon zooming, the control of a telescopic zoom lens system becomes easier. This is because the traveling distance of the focusing lens group is the same throughout all the focal-length ranges.

Even if there is an advantage of carrying out focusing by the positive first lens group 10 which remains stationary upon zooming, the positive first lens group 10 has a large diameter and is heavy. Therefore using the entire positive first lens group to carry out focusing would cause much burden on the driving system (driving motor) for the positive first lens group (the focusing lens group), so that a quick focusing operation would be difficult.

Then, the positive first lens group 10 is divided into the front sub-lens group 10F and the rear sub-lens group 10R; and the rear sub-lens group 10R is arranged to function as a focusing lens group. Due to this arrangement, a quick focusing operation is possible. Furthermore, since the front sub-lens group 10F is arranged to remain stationary upon both zooming and focusing, the overall length of the telescopic zoom lens system does not vary, so that usability of the telescopic zoom lens system can be enhanced.

The rear sub-lens group 10R, which functions as a focusing lens group, is preferably constituted by a negative meniscus lens element having the convex surface toward the object and a positive lens element having a convex surface facing toward the object, in this order from the object.

In the prior art, there is a case where a rear sub-lens group (corresponding to the rear sub-lens group 10R of the illustrated embodiment) is constituted by a positive single lens element. However, a focusing lens group constituted by a positive single lens element cannot correct chromatic aberration by the focusing lens group itself. Therefore fluctuations in chromatic aberrations upon focusing become larger.

In the embodiments of the present invention, for the purpose of eliminate the drawback discussed above, by constituting the focusing lens group (i.e., the rear sub-lens group 10R) with two lens elements, i.e., a negative meniscus lens element and a positive lens element, chromatic aberrations can be corrected by the focusing lens group itself, and fluctuations in chromatic aberration can be made smaller over the entire telescopic zoom lens system upon focusing.

Furthermore, by forming the most object-side lens surface of the rear sub-lens group 10R as a convex surface, an incident angle of a bundle of light rays incident on each lens surface can be made smaller; thereby, the correcting of spherical aberration and coma can be made within the rear sub-lens group 10R. Consequently, fluctuations in aberrations upon focusing over the entire telescopic zoom lens system can be reduced.

Condition (1) specifies the ratio of the focal length of the rear sub-lens group 10R (i.e., the focusing lens group) of the positive first lens group 10 to the focal length of the entire telescopic zoom lens system at the long focal length extremity.

If the positive refractive power of the rear sub-lens group 10R becomes weaker to the extent that f1R/ft exceeds the upper limit of condition (1), the travelling distance of the rear sub-lens group 10R upon focusing becomes longer. Consequently, a position (from the optical axis) where a bundle of off-axis light rays passes through the rear sub-lens group 10R largely varies according to a focusing position of the rear sub-lens group 10R, so that fluctuations in field curvature and fluctuations in off-axis coma become larger.

If the positive refractive power of the rear sub-lens group 10R becomes stronger to the extent that f1R/ft exceeds the lower limit of condition (1), the correcting of spherical aberration and coma becomes difficult.

In the telescopic zoom lens system of the present invention, the positive fourth lens group 40 is preferably divided into the front sub-lens group 40F and the rear sub-lens group 40R at a maximum air-distance therebetween; and the rear sub-lens group 40R preferably satisfies condition (2).

If the positive refractive power of the rear sub-lens group 40R becomes weaker to the extent that f4R/fw exceeds the upper limit of condition (2), the correcting of distortion becomes insufficient.

If the positive refractive power of the rear sub-lens group 40R becomes stronger to the extent that f4R/fw exceeds the lower limit of condition (2), the correcting of spherical aberration and coma becomes difficult.

Furthermore, a fixed-aperture diaphragm FS is preferably provided between the front sub-lens group 40F and the rear sub-lens group 40R of the positive fourth lens group 40. By providing the fixed-aperture diaphragm FS in the positive fourth lens group 40 which is the most image-side lens group in the telescopic zoom lens system, a bundle of off-axis light rays can be effectively shielded, regardless of the focal length, at the rear sub-lens group 40R which is position on the image-side of the fixed-aperture diaphragm FS.

In the telescopic zoom lens system of the present invention, one of the positive lens elements in the positive first lens group 10 is preferably made of a glass material having an Abbe number of 80 or more.

If plural positive lens elements are made of a glass material having an Abbe number of 80 or more are provided in the first lens group 10, it is advantageous to correct axial chromatic aberration; however, the correcting of lateral chromatic aberration becomes difficult.

Furthermore, a glass material having an Abbe number of 80 or more generally has large shape-deforming properties due to changes in temperature.

In the telescopic zoom lens system according to the present invention, the positive lens elements of the positive first lens group 10 have large diameters. Therefore if plural positive lens elements are made of a glass material having an Abbe number of 80 or more, the changes in the focal length and the back focal distance due to changes in temperature, and the changes in aberrations due to changes in temperature becomes undesirably noticeable.

In order to adequately correct spherical aberration and axial chromatic aberration, it is preferable that condition (3) be satisfied.

If the positive refractive power of the positive first lens group 10 becomes weaker to the extent that fl/fw exceeds the upper limit of condition (3), the correcting of lateral chromatic aberration becomes insufficient.

If the positive refractive power of the positive first lens group 10 becomes stronger to the extent that fl/fw exceeds the lower limit of condition (3), the correcting of spherical aberration and axial chromatic aberration becomes difficult.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire fisheye zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number.

The values for the distance "d" are indicated in the order of the short focal length extremity, an intermediate focal length and the long focal length extremity.

Embodiment 1

FIG. 1 is the lens arrangement of the telescopic zoom lens system, at the short focal length extremity. FIGS. 2A through 2E show aberrations occurred, at the short focal length extremity, in the lens arrangement shown in FIG. 1.

FIG. 3 is the lens arrangement of the telescopic zoom lens system, at the long focal length extremity. FIGS. 4A through 4E show aberrations occurred, at the long focal length extremity, in the to lens arrangement shown in FIG. 3.

Table 1 shows the numerical values of the first embodiment.

The telescopic zoom lens system of the present invention includes a positive first lens group 10, a negative second lens group 20, a positive third lens group 30, and a positive fourth lens group 40, in this order from the object.

The positive first lens group 10 includes cemented lens elements having a negative meniscus lens element having the convex surface fading toward the object and a positive meniscus lens element having the convex surface facing toward the object, a positive meniscus lens element having the convex surface facing toward the object, a negative meniscus lens element having the convex surface facing toward the object, and a positive biconvex lens element, in this order from the object. The three lens elements from the object constitute the front sub-lens group 10F and the remaining lens elements constitute the rear sub-lens group 10R.

The negative second lens group 20 includes a negative biconcave lens element, cemented lens elements having a negative biconcave lens element and a positive meniscus lens element having the convex surface facing toward the object, and a negative meniscus lens element having the convex surface facing toward the image, in this order from the object.

The positive third lens group 30 includes a positive meniscus lens element having the convex surface facing toward the image, and cemented lens elements having a positive biconvex lens element and a negative meniscus lens element having the convex surface facing toward the image, in this order from the object.

The positive fourth lens group 40 includes a positive meniscus lens element having the convex surface facing toward the object, cemented lens elements having a positive biconvex lens element and a negative biconcave lens element, a positive biconvex lens element, a negative meniscus lens element having the convex surface facing toward the image, and a positive meniscus lens element having the convex surface facing toward the object, in this order from the object. The three lens elements from the object constitute the front sub-lens group 40F and the remaining lens elements constitute the rear sub-lens group 40R.

The variable-aperture diaphragm KS is provided 2.00 in front of surface No. 22 (the positive fourth lens group 40), and the fixed-aperture diaphragm FS is provided 4.00 behind surface No. 26.

TABLE 1

F = 1:2.9-2.9-2.9
f = 51.50-100.00-146.00 (Zoom Ratio = 2.83)
W = 15.8-8.0-5.5
fB = 39.70-39.70-39.70

| Surf. No. | r | d | $N_d$ | v |
|---|---|---|---|---|
| 1 | 117.259 | 2.20 | 1.77716 | 46.0 |
| 2 | 56.610 | 8.78 | 1.48749 | 70.2 |
| 3 | 514.871 | 0.10 | — | — |
| 4 | 61.808 | 6.59 | 1.49700 | 81.6 |
| 5 | 201.351 | 13.04 | — | — |
| 6 | 53.555 | 2.00 | 1.84666 | 23.8 |
| 7 | 42.355 | 1.24 | — | — |
| 8 | 47.572 | 8.69 | 1.48749 | 70.2 |
| 9 | −1480.709 | 1.50-21.11-27.55 | — | — |
| 10 | −541.075 | 1.20 | 1.80400 | 46.6 |
| 11 | 24.441 | 5.51 | — | — |
| 12 | −89.935 | 1.20 | 1.48749 | 70.2 |
| 13 | 25.174 | 4.60 | 1.84666 | 23.8 |
| 14 | 152.990 | 2.87 | — | — |
| 15 | −42.933 | 1.20 | 1.72916 | 54.7 |

TABLE 1-continued

| | | | | |
|---|---|---|---|---|
| 16 | −345.673 | 19.87−10.65−2.00 | — | — |
| 17 | −25471.148 | 2.94 | 1.80610 | 40.9 |
| 18 | −94.400 | 0.10 | — | — |
| 19 | 120.786 | 5.60 | 1.49700 | 81.6 |
| 20 | −28.577 | 1.20 | 1.80518 | 25.4 |
| 21 | −51.630 | 13.60−3.21−5.42 | — | — |
| 22 | 100.269 | 2.19 | 1.65726 | 34.4 |
| 23 | 280.987 | 0.40 | — | — |
| 24 | 22.271 | 8.26 | 1.48749 | 70.2 |
| 25 | −1351.900 | 1.40 | 1.68965 | 40.5 |
| 26 | 31.458 | 14.93 | — | — |
| 27 | 135.502 | 5.79 | 1.58821 | 39.4 |
| 28 | −30.765 | 3.61 | — | — |
| 29 | −20.339 | 1.20 | 1.80100 | 35.0 |
| 30 | −63.586 | 0.10 | — | — |
| 31 | 62.025 | 3.40 | 1.51633 | 64.1 |
| 32 | 4807.794 | — | — | — |

Embodiment 2

FIG. 5 is the lens arrangement of the telescopic zoom lens system, at the short focal length extremity. FIGS. 6A through 6E show aberrations occurred, at the short focal length extremity, in the lens arrangement shown in FIG. 5.

FIG. 7 is the lens arrangement of the telescopic zoom lens system, at the long focal length extremity. FIGS. 8A through 8E show aberrations occurred, at the long focal length extremity, in the lens arrangement shown in FIG. 7.

Table 2 shows the numerical values of the second embodiment.

The basic lens arrangement of the second embodiment is the same as that of the first embodiment.

The variable diaphragm KS is provided 2.00 in front of surface No. 22 (the positive fourth lens group 40), and the fixed diaphragm FS is provided 3.00 behind surface No. 26.

TABLE 2

F = 1:2.9-2.9-2.9
f = 51.50-100.00-145.50 (Zoom Ratio = 2.83)
W = 15.9-8.0-5.5
fB = 39.70-39.70-39.70

| Surf. No. | r | d | $N_d$ | ν |
|---|---|---|---|---|
| 1 | 120.112 | 2.20 | 1.74400 | 44.8 |
| 2 | 57.176 | 9.08 | 1.48749 | 70.2 |
| 3 | 342.241 | 0.10 | — | — |
| 4 | 63.311 | 6.72 | 1.49700 | 81.6 |
| 5 | 196.124 | 14.96 | — | — |
| 6 | 56.412 | 2.00 | 1.80518 | 25.4 |
| 7 | 44.128 | 1.27 | — | — |
| 8 | 50.212 | 8.57 | 1.48749 | 70.2 |
| 9 | −1557.840 | 1.50−22.56−29.75 | — | — |
| 10 | −848.132 | 1.20 | 1.80400 | 46.6 |
| 11 | 26.227 | 4.37 | — | — |
| 12 | −75.533 | 1.20 | 1.48749 | 70.2 |
| 13 | 27.977 | 4.60 | 1.84666 | 23.8 |
| 14 | 451.537 | 2.50 | — | — |
| 15 | −43.202 | 1.20 | 1.77250 | 49.6 |
| 16 | −269.577 | 21.79−11.75−2.10 | — | — |
| 17 | −716.034 | 2.66 | 1.78590 | 44.2 |
| 18 | −109.045 | 0.10 | — | — |
| 19 | 142.314 | 5.52 | 1.49700 | 81.6 |

TABLE 2-continued

| | | | | |
|---|---|---|---|---|
| 20 | −30.335 | 1.20 | 1.80518 | 25.4 |
| 21 | −53.835 | 14.51−3.48−5.95 | — | — |
| 22 | 99.477 | 2.44 | 1.78590 | 44.2 |
| 23 | 533.447 | 0.40 | — | — |
| 24 | 22.108 | 9.00 | 1.49700 | 81.6 |
| 25 | −360.599 | 1.90 | 1.70000 | 48.1 |
| 26 | 29.066 | 13.22 | — | — |
| 27 | 82.537 | 6.72 | 1.56732 | 42.8 |
| 28 | −30.817 | 3.24 | — | — |
| 29 | −20.744 | 1.20 | 1.80100 | 35.0 |
| 30 | −63.956 | 0.10 | — | — |
| 31 | 71.278 | 2.25 | 1.60562 | 43.7 |
| 32 | 223.872 | — | — | — |

Embodiment 3

Figure 9:
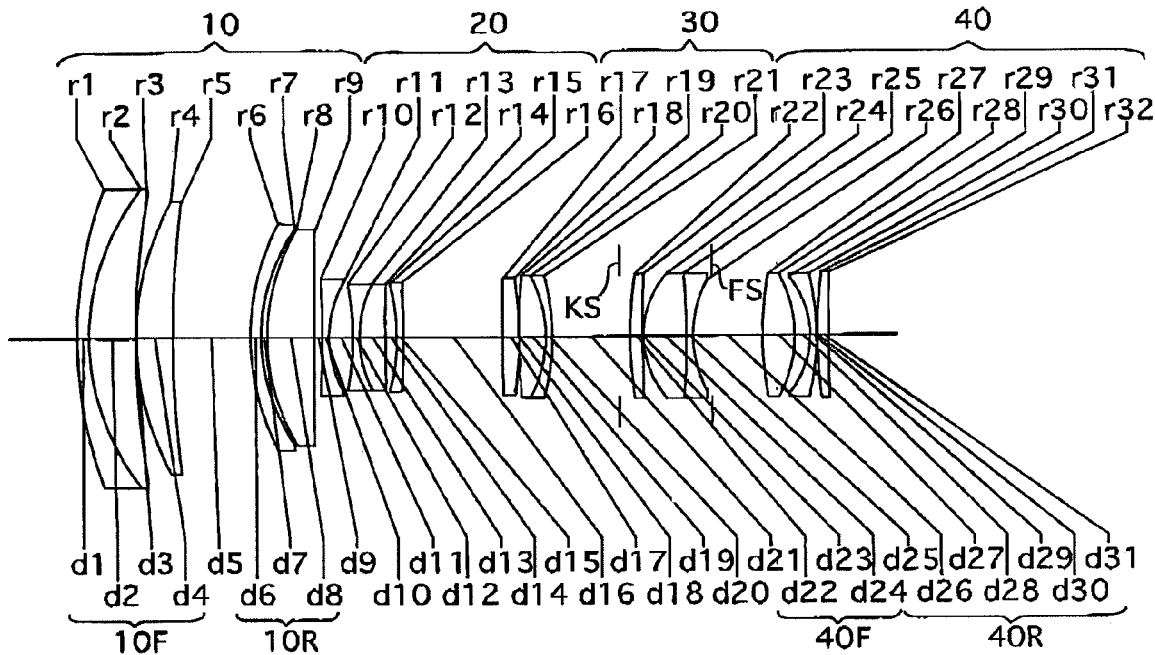
FIG. 9 is a lens arrangement of the telescopic zoom lens system, at the short focal length extremity, according to a third embodiment of the present invention.
Figures 10A, 10B, 10C, 10D, 10E:
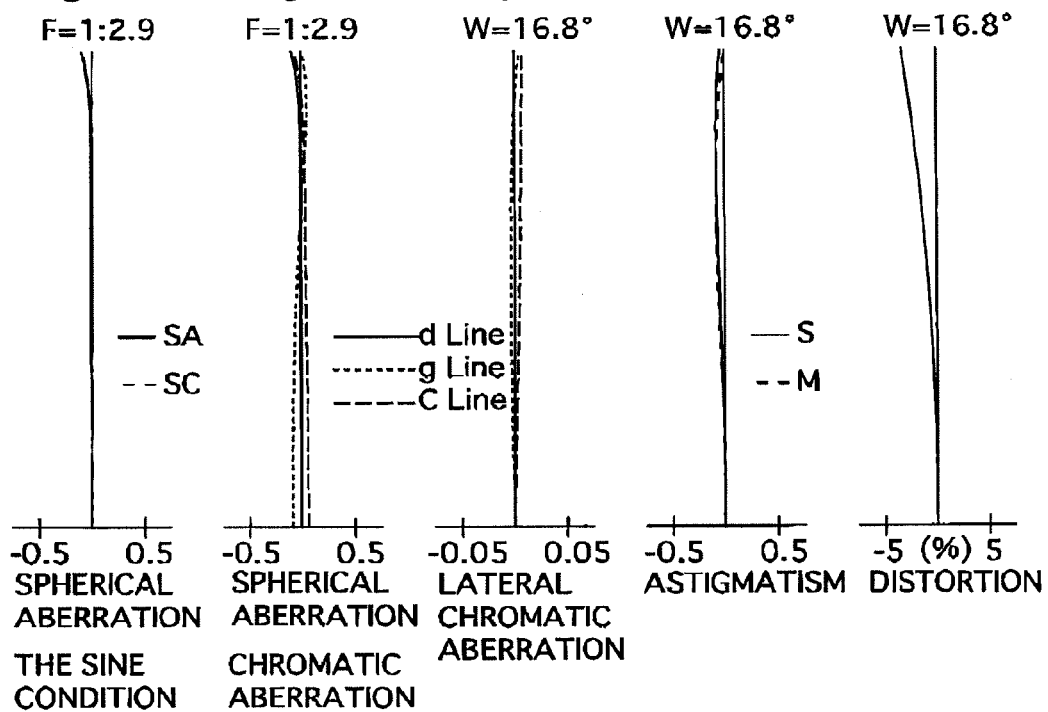
FIGS. 10A, 10B, 10C, 10D and 10E show aberrations occurred, at the short focal length extremity, in the lens arrangement shown in FIG. 9.

FIG. 9 is the lens arrangement of the telescopic zoom lens system, at the short focal length extremity. FIGS. 10A through 10E show aberrations occurred, at the short focal length extremity, in the lens arrangement shown in FIG. 9.

Figure 11:
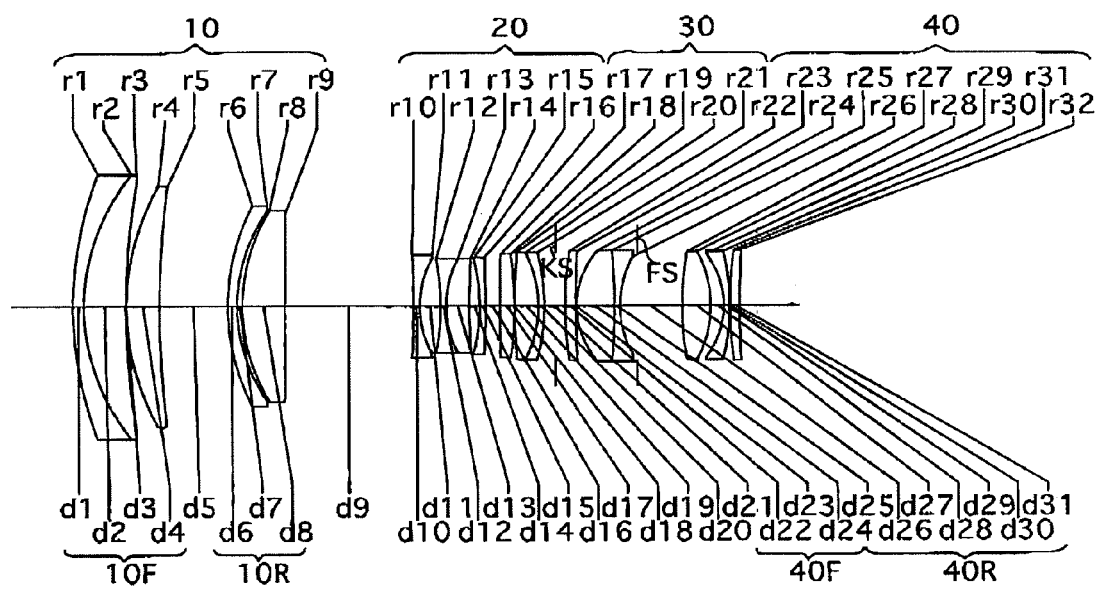
FIG. 11 is a lens arrangement of the telescopic zoom lens system, at the long focal length extremity, according to the third embodiment of the present invention.
Figures 12A, 12B, 12C, 12D, 12E:
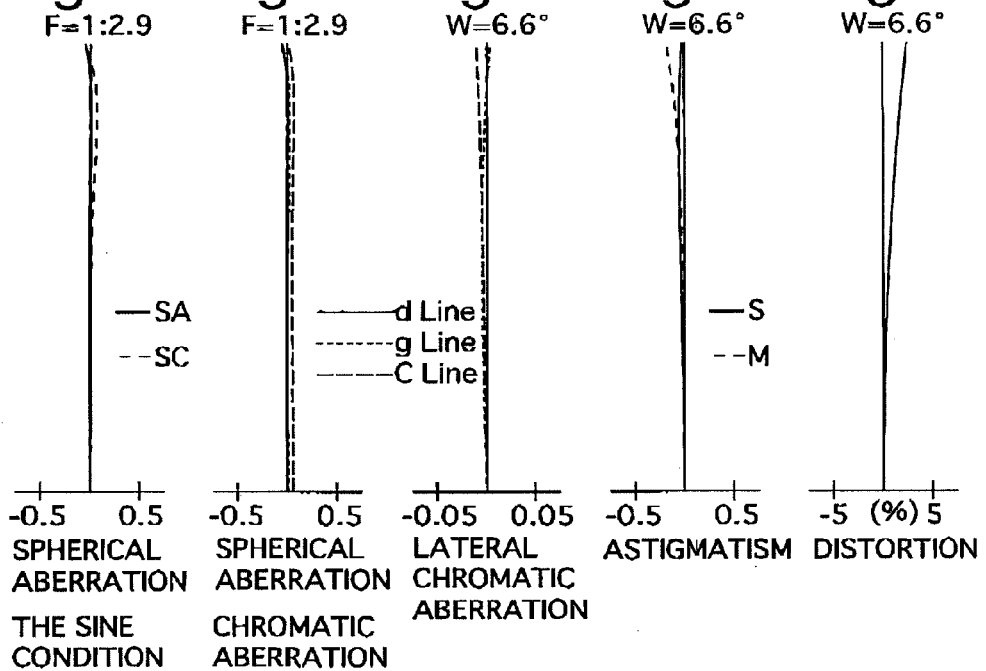
FIGS. 12A, 12B, 12C, 12D and 12E show aberrations occurred, at the long focal length extremity, in the lens arrangement shown in FIG. 11.

FIG. 11 is the lens arrangement of the telescopic zoom lens system, at the long focal length extremity. FIGS. 12A through 12E show aberrations occurred, at the long focal length extremity, in the lens arrangement shown in FIG. 11.

Table 3 shows the numerical values of the third embodiment.

The positive first lens group 10 includes cemented lens elements having a negative meniscus lens element having the convex surface facing toward the object and a positive meniscus lens element having the convex surface facing toward the object, a positive meniscus lens element having the convex surface facing toward the object, a negative meniscus lens element having the convex surface facing toward the object, and a positive meniscus lens element having the convex surface facing toward the object, in this order from the object. The three lens elements from the object constitute the front sub-lens group 10F and the remaining lens elements constitute the rear sub-lens group 10R.

The positive third lens group 30 includes a positive biconvex lens element, and cemented lens elements having a positive biconvex lens element and a negative meniscus lens element having the convex surface facing toward the image, in this order from the object.

The remaining lens arrangement of the third embodiment is the same as that of the first embodiment.

The variable-aperture diaphragm KS is provided 2.00 in front of surface No. 22 (the positive fourth lens group 40), and the fixed-aperture diaphragm FS is provided 3.50 behind surface No. 26.

TABLE 3

F = 1:2.9-2.9-2.9
f = 51.50-85.00-131.00 (Zoom Ratio = 2.54)
W = 16.8-10.2-6.6
fB = 39.69-39.69-39.69

| Surf. No. | r | d | $N_d$ | ν |
|---|---|---|---|---|
| 1 | 96.690 | 2.20 | 1.74400 | 44.8 |
| 2 | 53.418 | 8.64 | 1.48749 | 70.2 |
| 3 | 187.506 | 0.10 | — | — |
| 4 | 63.413 | 6.84 | 1.49700 | 81.6 |
| 5 | 247.469 | 14.39 | — | — |

TABLE 3-continued

| | | | | |
|---|---|---|---|---|
| 6 | 55.107 | 2.00 | 1.80518 | 25.4 |
| 7 | 42.296 | 1.11 | — | — |
| 8 | 46.561 | 8.94 | 1.48749 | 70.2 |
| 9 | 8488.074 | 1.50-18.02-26.89 | — | — |
| 10 | −240.375 | 1.20 | 1.80400 | 46.6 |
| 11 | 25.128 | 4.41 | — | — |
| 12 | −61.757 | 1.20 | 1.48749 | 70.2 |
| 13 | 27.287 | 4.68 | 1.84666 | 23.8 |
| 14 | 337.845 | 2.17 | — | — |
| 15 | −45.767 | 1.20 | 1.77250 | 49.6 |
| 16 | −202.850 | 18.04-11.60-2.80 | — | — |
| 17 | 336.148 | 3.07 | 1.80400 | 46.6 |
| 18 | −95.869 | 0.10 | — | — |
| 19 | 229.790 | 4.91 | 1.49700 | 81.6 |
| 20 | −29.598 | 1.20 | 1.80518 | 25.4 |
| 21 | −53.537 | 14.51-4.42-4.35 | — | — |
| 22 | 91.958 | 2.29 | 1.77250 | 49.6 |
| 23 | 321.853 | 0.20 | — | — |
| 24 | 21.190 | 7.93 | 1.49700 | 81.6 |
| 25 | −157.683 | 1.20 | 1.66672 | 48.3 |
| 26 | 26.183 | 12.95 | — | — |
| 27 | 79.584 | 5.92 | 1.58144 | 40.7 |
| 28 | −28.507 | 2.79 | — | — |
| 29 | −20.892 | 1.20 | 1.80100 | 35.0 |
| 30 | −59.213 | 0.10 | — | — |
| 31 | 105.684 | 2.07 | 1.51633 | 64.1 |
| 32 | 458.366 | — | — | — |

Embodiment 4

FIG. 13 is the lens arrangement of the telescopic zoom lens system, at the short focal length extremity. FIGS. 14A through 14E show aberrations occurred, at the short focal length extremity, in the lens arrangement shown in FIG. 13.

Figure 15:
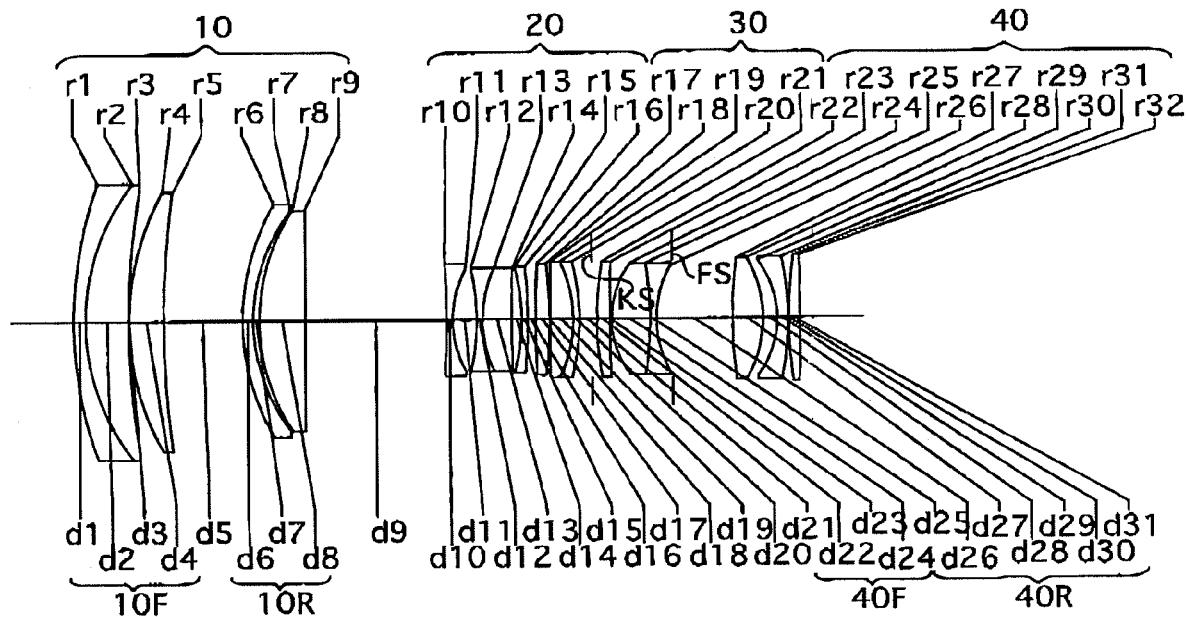
FIG. 15 is a lens arrangement of the telescopic zoom lens system, at the long focal length extremity, according to the fourth embodiment of the present invention.
Figures 16A, 16B, 16C, 16D, 16E:
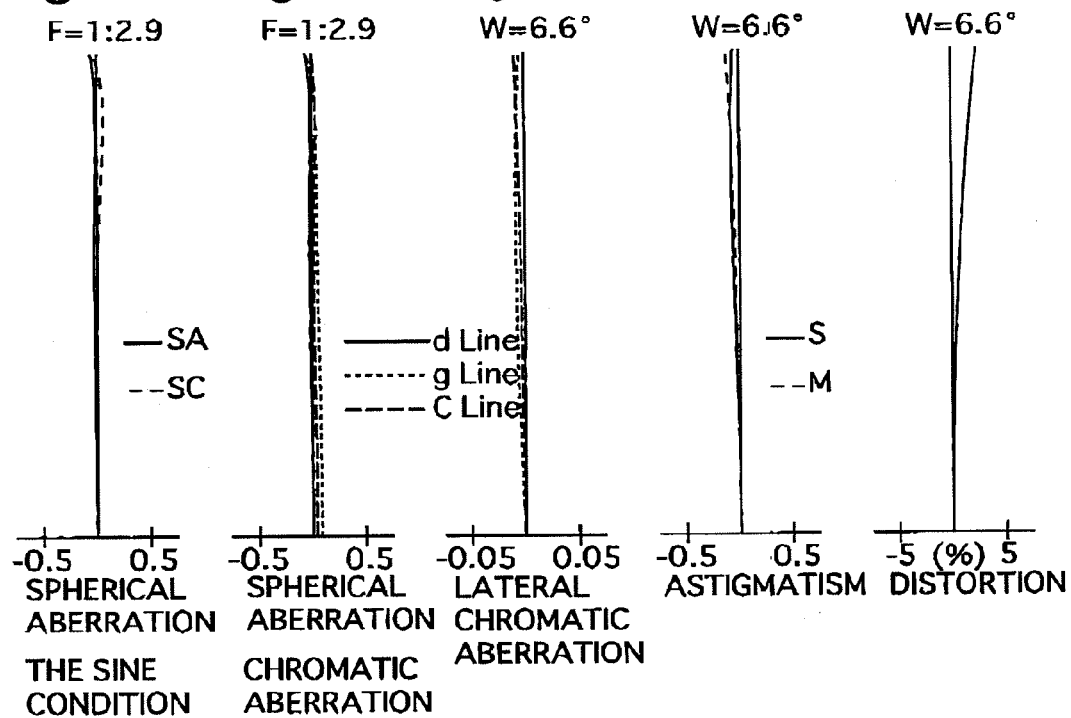
FIGS. 16A, 16B, 16C, 16D and 16E show aberrations occurred, at the long focal length extremity, in the lens arrangement shown in FIG. 15.

FIG. 15 is the lens arrangement of the telescopic zoom lens system, at the long focal length extremity. FIGS. 16A through 16E show aberrations occurred, at the long focal length extremity, in the lens arrangement shown in FIG. 15.

Table 4 shows the numerical values of the fourth embodiment.

The positive third lens group 30 includes a positive biconvex lens element, and cemented lens elements having a positive biconvex lens element and a negative meniscus lens element having the convex surface facing toward the image, in this order from the object.

The positive fourth lens group 40 includes a positive meniscus lens element having the convex surface facing toward the object, cemented lens elements having a positive biconvex lens element and a negative biconcave lens element, a positive biconvex lens element, a negative meniscus lens element having the convex surface facing toward the image, and a positive biconvex lens element, in this order from the object. The three lens elements from the object constitute the front sub-lens group 40F and the remaining lens elements constitute the rear sub-lens group 40R.

The remaining lens arrangement of the fourth embodiment is the same as that of the first embodiment.

The variable-aperture diaphragm KS is provided 1.00 in front of surface No. 22 (the positive fourth lens group 40), and the fixed-aperture diaphragm FS is provided 3.00 behind surface No. 26.

TABLE 4

F = 1:2.9-2.9-2.9
f = 51.50-85.00-131.00 (Zoom Ratio = 2.54)
W = 16.8-10.1-6.6
fB = 39.70-39.70-39.70

| Surf. No. | r | d | $N_d$ | ν |
|---|---|---|---|---|
| 1 | 95.120 | 2.30 | 1.74400 | 44.8 |
| 2 | 52.415 | 8.42 | 1.48749 | 70.2 |
| 3 | 178.821 | 0.10 | — | — |
| 4 | 62.843 | 6.72 | 1.49700 | 81.6 |
| 5 | 223.592 | 15.13 | — | — |
| 6 | 55.545 | 2.00 | 1.80518 | 25.4 |
| 7 | 42.737 | 1.17 | — | — |
| 8 | 47.601 | 8.75 | 1.48749 | 70.2 |
| 9 | −3615.125 | 1.70-18.38-27.46 | — | — |
| 10 | −241.157 | 1.20 | 1.80400 | 46.6 |
| 11 | 25.125 | 4.70 | — | — |
| 12 | −52.450 | 1.20 | 1.48749 | 70.2 |
| 13 | 28.699 | 5.66 | 1.84666 | 23.8 |
| 14 | 340.364 | 1.94 | — | — |
| 15 | −47.319 | 1.20 | 1.74320 | 49.3 |
| 16 | −123.977 | 17.51-10.79-1.50 | — | — |
| 17 | 226.079 | 2.73 | 1.77250 | 49.6 |
| 18 | −102.714 | 0.10 | — | — |
| 19 | 753.451 | 4.48 | 1.49700 | 81.6 |
| 20 | −30.585 | 1.20 | 1.80518 | 25.4 |
| 21 | −53.883 | 13.15-3.19-3.39 | — | — |
| 22 | 81.191 | 2.49 | 1.77250 | 49.6 |
| 23 | 494.973 | 0.31 | — | — |
| 24 | 21.664 | 7.44 | 1.49700 | 81.6 |
| 25 | −91.189 | 1.22 | 1.65844 | 50.9 |
| 26 | 25.338 | 14.53 | — | — |
| 27 | 105.893 | 5.88 | 1.60562 | 43.7 |
| 28 | −27.998 | 2.79 | — | — |
| 29 | −21.830 | 2.10 | 1.80100 | 35.0 |
| 30 | −65.262 | 0.11 | — | — |
| 31 | 109.134 | 2.07 | 1.48749 | 70.2 |
| 32 | −2798.868 | — | — | — |

Embodiment 5

FIG. 17 is the lens arrangement of the telescopic zoom lens system, at the short focal length extremity. FIGS. 18A through 18E show aberrations occurred, at the short focal length extremity, in the lens arrangement shown in FIG. 17.

FIG. 19 is the lens arrangement of the telescopic zoom lens system, at the long focal length extremity. FIGS. 20A through 20E show aberrations occurred, at the long focal length extremity, in the lens arrangement shown in FIG. 19.

Table 5 shows the numerical values of the fifth embodiment.

The positive third lens group 30 includes a positive biconvex lens element, and cemented lens elements having a positive meniscus lens element having the convex surface facing toward the image and a negative meniscus lens element having the convex surface facing toward the image, in this order from the object.

The remaining lens arrangement of the fifth embodiment is the same as that of the first embodiment.

The variable diaphragm KS is provided 1.00 in front of surface No. 22 (the positive fourth lens group 40), and the fixed diaphragm FS is provided 3.50 behind surface No. 26.

TABLE 5

F = 1:2.9-2.9-2.9
f = 51.50-85.00-131.00 (Zoom Ratio = 2.54)
W = 16.8-10.1-6.6
fB = 39.70-39.70-39.70

| Surf. No. | r | d | $N_d$ | ν |
|---|---|---|---|---|
| 1 | 105.398 | 2.30 | 1.74400 | 44.8 |
| 2 | 56.082 | 7.84 | 1.48749 | 70.2 |
| 3 | 180.272 | 0.10 | — | — |
| 4 | 66.104 | 6.43 | 1.49700 | 81.6 |
| 5 | 230.241 | 15.23 | — | — |
| 6 | 54.225 | 2.00 | 1.80518 | 25.4 |
| 7 | 42.675 | 1.05 | — | — |
| 8 | 48.313 | 8.82 | 1.48749 | 70.2 |
| 9 | −1617.704 | 2.30-19.73-29.44 | — | — |
| 10 | −181.711 | 1.20 | 1.80400 | 46.6 |
| 11 | 26.585 | 4.85 | — | — |
| 12 | −50.615 | 1.20 | 1.48749 | 70.2 |
| 13 | 30.138 | 3.60 | 1.84666 | 23.8 |
| 14 | 311.871 | 1.65 | — | — |
| 15 | −52.317 | 1.10 | 1.72916 | 54.7 |
| 16 | −100.273 | 19.04-11.78-1.50 | — | — |
| 17 | 174.749 | 2.14 | 1.77250 | 49.6 |
| 18 | −174.749 | 1.06 | — | — |
| 19 | −4485.526 | 4.73 | 1.49700 | 81.6 |
| 20 | −29.038 | 1.10 | 1.80518 | 25.4 |
| 21 | −49.755 | 13.18-3.01-3.58 | — | — |
| 22 | 73.832 | 2.65 | 1.77250 | 49.6 |
| 23 | 743.114 | 0.50 | — | — |
| 24 | 22.109 | 7.93 | 1.49700 | 81.6 |
| 25 | −105.602 | 1.58 | 1.65844 | 50.9 |
| 26 | 24.579 | 14.57 | — | — |
| 27 | 120.433 | 5.20 | 1.60562 | 43.7 |
| 28 | −28.928 | 3.00 | — | — |
| 29 | −22.288 | 1.24 | 1.80100 | 35.0 |
| 30 | −67.039 | 0.65 | — | — |
| 31 | 95.907 | 2.07 | 1.48749 | 70.2 |
| 32 | 3646.801 | — | — | — |

The numerical values of each condition for each embodiment are shown in Table 6.

TABLE 6

|  | Embod. 1 | Embod. 2 | Embod. 3 | Embod. 4 | Embod. 5 |
|---|---|---|---|---|---|
| Cond. (1) | 2.94 | 3.12 | 3.14 | 3.13 | 2.97 |
| Cond. (2) | 2.94 | 2.85 | 2.32 | 2.12 | 2.30 |
| Cond. (3) | 1.64 | 1.77 | 1.71 | 1.74 | 1.79 |

As can be understood from Table 6, the first through fifth embodiments satisfy conditions (1) through (3). Furthermore, as can be understood from the aberration diagrams, the various aberrations are adequately corrected.

According to the description, a miniaturized telescopic zoom lens system having the following features can be attained;

(i) an angle-of-view of approximately 10° to 30° (the zoom ratio: a little less than 3);

(ii) a long back focal distance;

(iii) a short focal length;

(iv) high optical quality; and (v) high operability.

What is claimed is:

1. A telescopic zoom lens system comprises a positive first lens group, a negative second lens group, a positive third lens group and a positive fourth lens group, in this order from an object, wherein upon zooming from the short focal length extremity to the long focal length extremity, said positive first and said positive fourth lens group remain stationary, said negative second lens group moves toward the image, and said positive third lens group first moves toward an image and thereafter moves toward the object;

wherein said positive first lens group comprises a positive front sub-lens group and a positive rear sub-lens group which are separated at a maximum air-distance therebetween;

wherein said positive rear sub-lens group functions as a focusing lens group;

wherein said positive rear sub-lens group comprises a negative meniscus lens element having the convex surface facing toward the object, and a positive lens element having a convex surface facing toward the object, in this order from the object;

wherein said positive rear sub-lens group satisfies the following condition:

$$2.7 < f1R/ft < 3.5$$

wherein f1R designates the focal length of said positive rear sub-lens group; and ft designates the focal length of the entire telescopic zoom lens system at the long focal length extremity.

2. The telescopic zoom lens system according to claim 1, wherein said positive fourth lens group comprises a front sub-lens group and a rear sub-lens group separated at a maximum air-distance therebetween; and wherein said rear sub-lens group satisfies the following condition:

$$1.8 < f4R/fw < 3.6$$

wherein f4R designates the focal length of said rear sub-lens group of said positive fourth lens group; and fw designates the focal length of the entire telescopic zoom lens system at the short focal length extremity.

3. The telescopic zoom lens system according to claim 2, wherein a fixed-aperture diaphragm is provided between said front sub-lens group and said rear sub-lens group of said positive fourth lens group.

4. The telescopic zoom lens system according to claim 1, wherein one positive lens element of said positive first lens group is made of a glass material having an Abbe number of 80 or more.

5. The telescopic zoom lens system according to claim 1, further satisfying the following condition:

$$1.6 < f1/fw < 2.5$$

wherein f1 designates the focal length of said positive first lens group; and fw designates the focal length of the entire telescopic zoom lens system at the short focal length extremity.

6. A telescopic zoom lens system comprises a positive first lens group, a negative second lens group, a positive third lens group and a positive fourth lens group, in this order from the object, wherein upon zooming from the short focal length extremity to the long focal length extremity, said positive first and said positive fourth lens group remain stationary, said negative second lens group moves toward the image, and said positive third lens group first moves toward an image and thereafter moves toward the object;

wherein said positive first lens group comprises a positive front sub-lens group and a positive rear sub-lens group which are separated at a maximum air-distance therebetween;

wherein said positive rear sub-lens group of said positive first lens group functions as a focusing lens group;

wherein said positive fourth lens group comprises a front sub-lens group and a rear sub-lens group separated at a maximum air-distance therebetween; and wherein said telescopic zoom lens system satisfies the following conditions:

$$2.7 < f1R/ft < 3.5$$

$$1.8 < f4R/fw < 3.6$$

wherein f1R designates the focal length of said positive rear sub-lens group of said positive first lens group;

f4R designates the focal length of said rear sub-lens group of said positive fourth lens group;

ft designates the focal length of the entire telescopic zoom lens system at the long focal length extremity; and fw designates the focal length of the entire telescopic zoom lens system at the short focal length extremity.

7. The telescopic zoom lens system according to claim 6, wherein a fixed-aperture diaphragm is provided between said front sub-lens group and said rear sub-lens group of said positive fourth lens group.

8. The telescopic zoom lens system according to claim 6, one positive lens element of said positive first lens group is made of a glass material having an Abbe number of 80 or more.

9. The telescopic zoom lens system according to claim 6, further satisfying the following condition:

$$1.6 < f1/fw < 2.5$$

wherein f1 designates the focal length of said positive first lens group; and fw designates the focal length of the entire telescopic zoom lens system at the short focal length extremity.

* * * * *